UNITED STATES PATENT OFFICE.

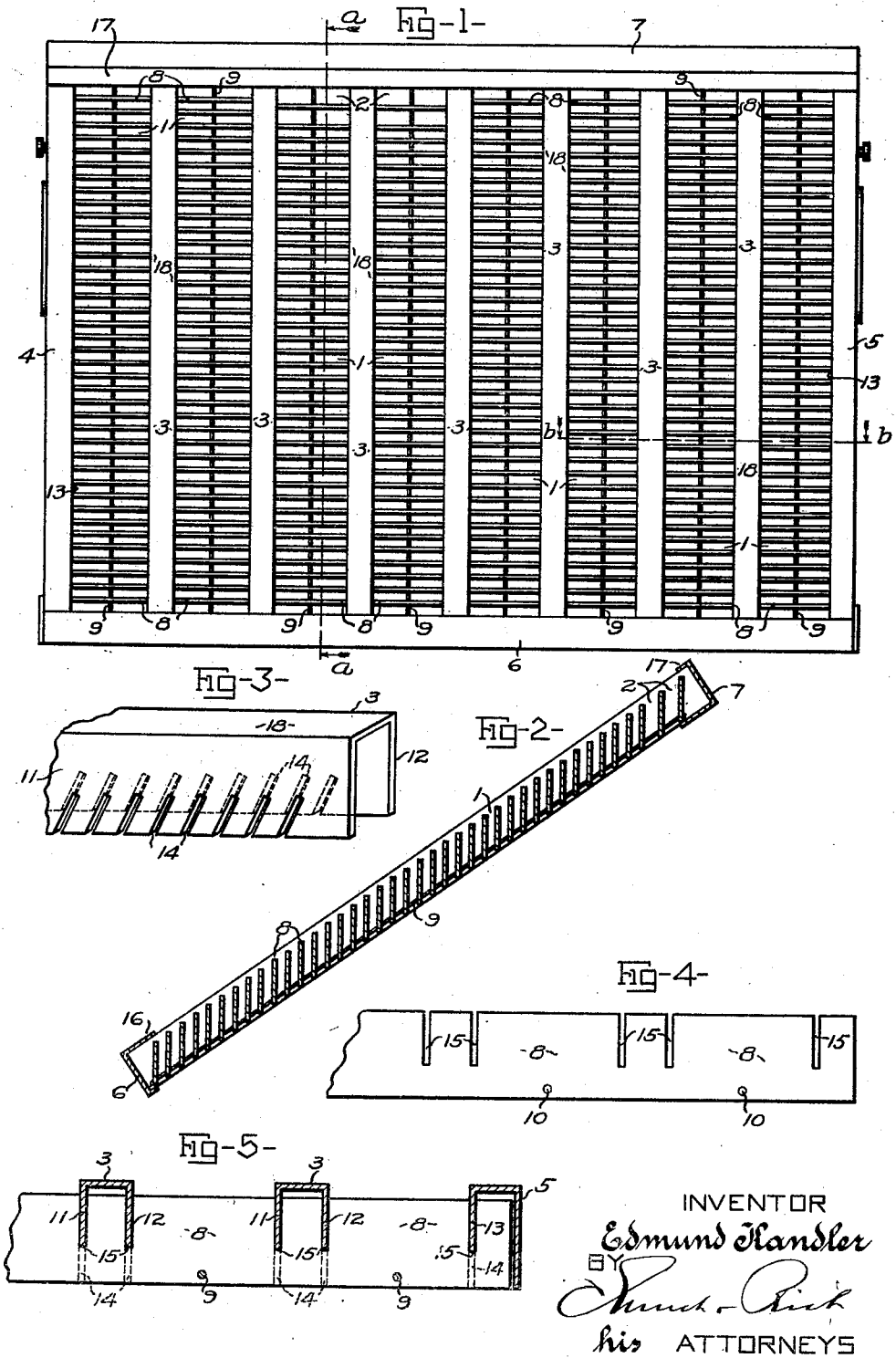

EDMUND KANDLER, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC-TEST-LENS TRAY.

1,274,557. Specification of Letters Patent. Patented Aug. 6, 1918.

Application filed January 25, 1917. Serial No. 144,351.

*To all whom it may concern:*

Be it known that I, EDMUND KANDLER, a citizen of the United States, residing at Rochester, in the county of Monroe, State of New York, have invented certain new and useful Improvements in Ophthalmic-Test-Lens Trays; and I do declare the following to be a full, clear, and exact description of the same, reference being had to the accompanying drawings, forming a part of this specification, and to the characters of reference marked thereon.

This invention relates to that class of trays used for holding the various lenses of an ophthalmic test lens set such as are employed by opticians in testing the refractive properties of a patient's eyes preparatory to fitting eye glasses or spectacles.

The invention has for its object to provide a sanitary tray for ophthalmic test lenses which may be easily and thoroughly cleansed or sterilized, has a pleasing appearance, is light in weight, and is practically indestructible under any ordinary conditions of use.

In the drawings:

Figure 1 is a plan view of the improved test lens tray as it appears in an inclined position when set up for use. Fig. 2 is a transverse sectional view of the set up tray taken on the line *a—a* in Fig. 1. Fig. 3 is an enlarged perspective view of an end portion of one of the inner channel partitions of the tray. Fig. 4 is an enlarged face view of an end portion of one of the lens chamber wall plates which range transversely to the channel partitions. Fig. 5 is an enlarged cross sectional view taken on the line *b—b* in Fig. 1.

This improved test lens tray may have any size or general dimensions necessary to include the required number of narrow chambers 1, in which to place comparatively thin spherical and cylindrical test lenses, and a comparatively few, say four, wider chambers 2, in which to place prismatic test lenses. In the first illustrated construction the lens chambers 1, 2, which are entirely open at the top and slightly obstructed at the bottom, are formed by a series of substantially parallel inner metal channel partitions 3, of which seven are shown, two sheet metal opposite end channel frame portions 4, 5, front and rear sheet metal channel frame portions 6, 7, a series of flat sheet metal wall plates 8 ranging approximately parallel with each other and with the frame parts 6, 7, and a series of wires or light rods 9, fixed to or held in the lower parts of the wall plates 8, to range transversely across the center of the bottom openings of each of the front to back row of lens chambers 1 or 1, 2, whereby said wires 9, form light, readily cleansable and efficient bottom supports for holding the test lenses in the tray chambers. The lens supporting wires 9, preferably pass through openings 10 formed in the lens chamber wall plates 8, and may be upset or bent upon the outside of the front and rear plates, as more clearly shown in Fig. 2 of the drawings.

Figs. 3, 4, and 5 of the drawings illustrate that opposite side walls 11, 12, of the channel partitions 3, and the inner side walls 13, see Fig. 5, of both channel frame portions 4, 5, are all by preference obliquely slotted upwardly from their lower edges at 14 squarely through and approximately one half way across the walls, and Figs. 4 and 5 indicate that all the lens chamber wall plates 8 are right angularly slotted downwardly from their upper edges at 15, squarely through and approximately one half way across the plates, thus allowing the slotted portions 3, 4, 5, 8, to be right angularly engaged and interlocked while those portions of the parts 3, 4, 5, above the slots 14 extend in unbroken lengths between the opposite tray frame portions 6, 7, and those portions of the wall plates 8 below the slots 15 extend in unbroken lengths between the opposite frame portions 4, 5. After the tray portions 3, 4, 5, 8, thus are interlockingly assembled and the wires 9 are extended through the openings 10 of the wall plates 8, and are fastened at their ends, the opposing tray frame portions 6, 7, are applied over the ends of the tray portions 3, 4, 5, and are soldered or welded thereto to completely form a tray structure the parts of which may receive any preferred enamel or other finish. The wires 9 not only provide supports for the lenses to be contained in the chambers but they also hold the wall plates 8 in interlocking engagement with the channel partitions 3 by binding the wall plates together and tending to cramp the plates 8 within the slots 14 of the channel partitions. The exposed edge of the preferably longer wall 16 of the front channel frame portion 6, and the exposed edge of the preferably shorter wall 17 of the rear channel frame portion 7, are about in line with the adjacent edges of the respective upper and lower tray walls 8, as more clearly shown in Fig. 2 of the drawings. Formation of the slots 14 obliquely in the tray portions 3, 4, 5, and the interlocking therewith of the right angularly slotted lens chamber walls 8, as above described, assures a substantially vertical disposal of all the lens chambers 1, 2, when the tray is set up for use in the usual inclined position shown in Figs. 1 and 2 of the drawings.

On the exposed faces 18 of the first, third, fifth and seventh channel partitions 3 are located any desired markings indicating the refraction of the particular test lenses to be placed in the tray chambers 1, 2, to the right and left hand of each of said partitions. These markings may conform to any chosen standard of optical measurements or values, and are not shown in the drawings since they form no part of this invention.

It will be specially noticed that the assembled tray portions 3, 8, 9, constitute in or of themselves a reticulated or chambered unitary lens holding structure which may or may not be surrounded by a protective finishing frame of any character, such as a wood frame the opposite ends of which would form outer end walls for the extreme right and left hand rows of lens chambers 1, the parallel wall plates 8, of which may be either let into the wood frame bars or may be cut off flush with the inner faces of said bars. It is preferred to make the marginal tray frame of end channel bars 4, 5, and front and rear channel bars 6, 7, as above described, as such a frame provides by the slots 14 of the inner flanges 13 of the end frame bars 4, 5, for close and secure interlocking with opposite ends of the chamber walls 8, while at the same time imparting a pleasing finish at the tray ends substantially like that afforded by the front and rear channel frame bars 6, 7, which cover and conceal the opposite ends of the tray channel partitions 3, and the frame channel bars 4, 5. This preferred marginal tray frame also gives the tray structure maximum strength assuring its greater durability.

Practically all portions of this improved test lens tray may be made of metal, celluloid, hard rubber or other tough readily cleansable material, and as the lens chambers 1, 2, are entirely open at the top and are but slightly obstructed at their bottom by the lens retaining wires or parts, it is obvious that the entire tray may be readily cleansed by pouring upon and through it any suitable antiseptic fluid, or by immersing it in a bath of such fluid, or by boiling it in water, or by subjecting it to antiseptic fumes, and thus the tray may at all times be kept thoroughly sterilized for most acceptable and safe use.

It is obvious that a test lens tray made of parts formed and relatively assembled as above described and in accordance with this invention, is at once sanitary, light in weight, inexpensive, convenient and practically indestructible under any ordinary conditions of use.

Having thus described my invention, what I claim and desire to secure by Letters Patent of the United States is:

1. An ophthalmic test lens tray embodying channel partitions, plate partitions crossing them and in engagement therewith and together forming a plurality of lens chambers open through from top to bottom, and means for retaining the lenses in the chambers.

2. An ophthalmic test lens tray embodying a series of obliquely slotted channel partitions, plate partitions engaging with the slots of the series of channel partitions and together forming a plurality of lens chambers open through from top to bottom and ranging obliquely to the general facial plane of the tray, and means for retaining the lenses in the chambers.

3. An ophthalmic test lens tray embodying channel partitions having oblique slots and plate partitions having slots at substantially right angles to an edge thereof, said respective partitions being interlocked at their slots to form the lens chambers which range obliquely to the general facial plane of the tray, and means for retaining the lenses in the chambers.

4. An ophthalmic test lens tray embodying channel partitions and plate partitions interlocking therewith and together forming a plurality of lens chambers open through from top to bottom, means for supporting the lenses in the chambers, and a marginal frame for the partitions including an outer pair of channel partitions provided at their inner portions with plate partition supporting means, and a pair of channel bars ranging parallel to the plate partitions and joined to the outer channel partitions.

5. An ophthalmic test lens tray embodying channel partitions, plate partitions interlocking therewith and together forming a plurality of lens chambers open through from top to bottom, means for supporting the lenses in the chambers, and a marginal finishing frame comprising front and rear bars, and opposite end channel bars secured to the front and rear frame bars and slotted at their inner flanges and receiving the ends of the plate partitions in said slots.

6. An ophthalmic test lens tray embodying channel partitions, plate partitions interlocking therewith and together forming a plurality of lens chambers open through from top to bottom, means for supporting the lenses in the chambers, and a marginal finishing frame comprising opposite end bars, and front and rear channel bars embracing and concealing the ends of the channel partitions and secured to the end frame bars.

7. An ophthalmic test lens tray embodying channel partitions and plate partitions, the plate partitions and flanges of the channel partitions being slotted and interlocked at their slots to form a plurality of lens chambers open through from top to bottom, means for supporting the lenses in the chambers, and a marginal frame applied to said channel and plate partitions and forming a strengthening border finish for the tray.

8. An ophthalmic test lens tray embodying channel partitions and plate partitions, the plate partitions and flanges of the channel partitions being slotted and interlocked at their slots to form a plurality of lens chambers open through from top to bottom, means for supporting the lenses in the chambers, and a marginal frame of channel bars applied to said partitions, the inner flanges of the end frame bars being slotted correspondingly with the channel partitions and interlocking with slotted end portions of the plate partitions, said frame forming a strengthening border finish for the tray.

9. An ophthalmic test lens tray embodying channel partitions and plate partitions, the channel partitions having oblique slots and the plate partitions having slots of substantially right angles to an edge thereof, said channel and plate partitions being interlocked at their slots to form the lens chambers which range obliquely to the general facial plane of the tray, means for supporting the lenses in the chambers, and a marginal frame of channel bars applied to said partitions, the inner flanges of the end frame bars being obliquely slotted in correspondence with the slots of the channel partitions and interlocking with slotted end portions of the plate partitions, said frame forming a strengthening border finish for the tray.

10. In a test lens tray, the combination with a plurality of substantially flat partition strips forming the side walls of a series of alined chambers and having slots therein, of a plurality of cross rails forming the ends of the said chambers and acting as spacing means for the strips, said rails comprising U shaped channel members having slots in their lateral walls interlocking with the slots in the strips and having their intermediate walls raised above the upper edges of the strips.

11. In a test lens tray, the combination with a plurality of substantially flat partition strips forming the side walls of a series of alined chambers and having slots therein, of a plurality of cross rails forming the ends of said chambers and acting as spacing means for the strips, said rails comprising U shaped channel members having slots in their lateral walls interlocking with the slots in the strips, and a wire passing transversely through the bottom portion of each of the flat partition strips and between each pair of cross rails, to close the bottom of the chamber and to hold the partition strips in locking engagement with the rails.

EDMUND KANDLER.

Copies of this patent may be obtained for five cents each, by addressing the "Commissioner of Patents, Washington, D. C."